Patented Aug. 15, 1950

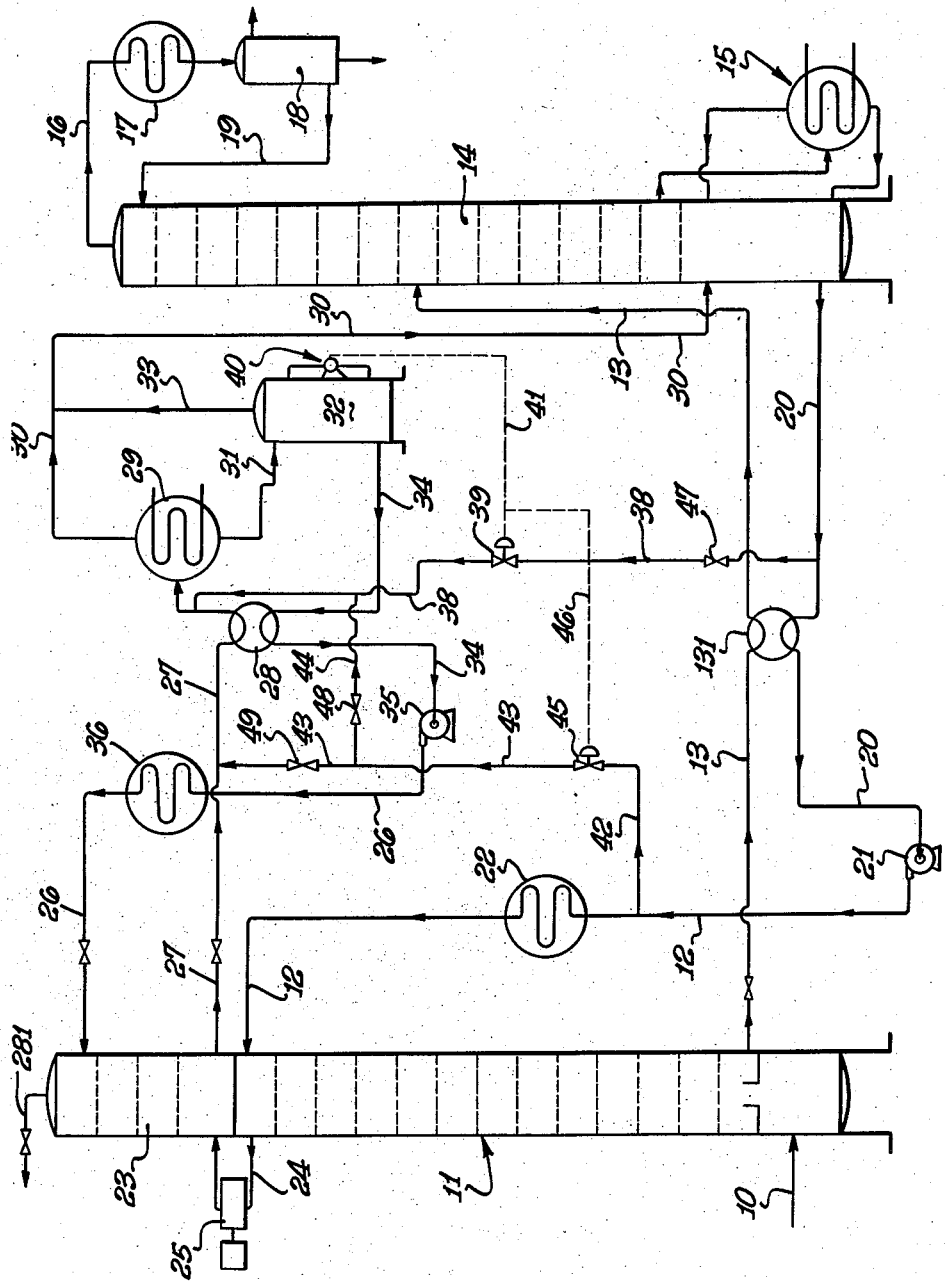

2,518,752

UNITED STATES PATENT OFFICE 2,518,752

PURIFICATION AND DEHYDRATION OF GASES

William F. Chapin, Whittier, Calif., assignor to The Fluor Corporation, Ltd., Los Angeles, Calif., a corporation of California Application June 28, 1948, Serial No. 35,673

6 Claims. (Cl. 23—2)

This invention has to do with the treatment of gaseous mixtures, notably natural and refinery hydrocarbon gases, for the removal of acidic impurities such as hydrogen sulfide and carbon dioxide, and also moisture initially contained in the gas. More particularly, the invention is directed to improvements in the type of process disclosed in Patent No. 2,435,089, issued January 27, 1948, on "Gas Purification and Dehydration Process."

According to the McCartney process, the gas to be treated is contacted with a first treating solution containing an acid gas absorbent, and the solution is continuously circulated through a first heating zone or still to regenerate the absorbent by driving off the acidic impurities. Following removal of acidic constituents, the gas is contacted with a second solution containing a moisture absorbent, under conditions such that any carry-over of the acid gas absorbent from the first treating solution, is recovered together with absorbed moisture in the second solution. The latter is continuously circulated through and regenerated in a second heating zone, from which the evolved vapors are passed to the first heating zone for recovery of the acid gas absorbent carry-over and its return to the first mentioned treating cycle.

It is found that regeneration of the second solution in the second heating zone may result in vaporization and carry-over into the first heating zone, of quantities of the moisture absorbent, so that in the course of extended operation the second solution may become seriously depleted with respect to the moisture absorbent. Accordingly, my primary object is to replace the moisture absorbent in the second solution so that its loss from the second heating zone is fully and automatically made-up or compensated.

The present invention contemplates the use of a first treating solution containing both acid gas and moisture absorbents, typically any suitable amine such as monoethanolamine, and a polyhydric alcohol such as diethylene glycol. The second treating solution will contain the same glycol as a moisture absorbent. Thus, regeneration of the second solution may release to the first heating zone, some vaporized glycol along with the amine vapors. Such depletion of the second solution with respect to glycol is compensated by introducing a portion or side stream of the first treating solution to the second solution, at a rate or in an amount which may be automatically controlled in accordance with the required glycol make-up. Preferably, the make-up is taken as a side stream from the lean first solution being returned to the contactor, and introduced to the rich second solution in or flowing to the second heating zone, all under automatic control, as will later appear.

All the various features and objects of the invention, as well as the details of an illustrative embodiment, will be understood to better advantage from the following detailed description of the accompanying drawing, which illustrates the invention in flow sheet form.

The hydrocarbon gas, to be treated, containing moisture and acidic impurities, is introduced through line 10 to the contactor column 11 within which the gas rises in intimate mixture with a down flowing stream of the regenerated first solution, being returned to the column through line 12. Typically this solution may contain 10 to 30 parts (by volume) of amine; 10 to 30 parts water, and the balance diethylene glycol. Leaving the contactor, the rich solution is discharged through line 13 and exchanger 131, to the first heating zone or still 14, which may consist of the usual stripping column equipped with the customary bottom reboiler and its connections with the column, all as generally indicated at 15. The absorbed acidic impurities, vaporized from the solution as a result of heating in the still, pass overhead through line 16 to the condenser 17, water condensate recovered in the accumulator 18 being return as reflux to the column through line 19. The lean or regenerated solution flows from the base of the still through line 20, and exchanger 131 to be returned by pump 21 through line 12 and cooler 22 to the contactor column 11.

Dehydration of the gas following removal of its acidic impurities in column 11, may take place at substantially the same pressure, or at a substantially higher pressure. In either case the gas stream may carry over small amounts of amine from the first treating solution, and which is to be recovered in the moisture absorption stage. The latter employs a second contactor column 23, or top section of the column 11, and into which the gas passes through line 24 which may include a compressor 25 when moisture absorption is to occur at increased pressure. Typically the pressure in column 11 may be in the order of 150 pounds p. s. i., and around 500 pounds p. s. i. in the second contacting zone 23. The gas flows upwardly within the latter column in contact with an aqueous glycol solution introduced through line 26 and which, after absorption of moisture and amine carry-over from the gas, is withdrawn through line 27. The treated gas leaves the column through line 28.

The rich second solution is discharged through line 27 and exchanger 28 to a second heating zone or reboiler 29 wherein the solution is heated sufficiently to vaporize the absorbed moisture and amine which are removed through line 30 to the first heating zone 14 wherein the amine is recovered by condensation in the first treating solution. The lean second solution flows from reboiler 29 through line 31 to an accumulator 32 having a vapor pipe connection 33 with line 30. From the accumulator the solution flows through line 34, exchanger 28 to be returned by pump 35 through line 26 and cooler 36 to the second stage contactor 23.

As previously indicated, the vapors leaving reboiler 29 through line 30 may contain small amounts of glycol which, though recovered in the still 14, deplete the second or moisture absorption solution to the extent of the carry-over. In accordance with the invention, a side stream of the first treating solution is added to the second solution in such quantity or rate as may be required to makeup or compensate for the glycol carry-over from the still 29.

Preferably the make-up is taken from the lean first solution being returned from still 14 through lines 20 and 12 to the contactor 11. For example, a side stream of the lean first solution may be taken from line 20 in advance of the exchanger 131, through line 38 and into the rich second solution flowing through line 27 to the reboiler 29. The rate of make-up may be controlled by valve 39 actuated in accordance with the liquid level in accumulator 32, as by way of a liquid level controller conventionally indicated at 40 having an upper connection diagrammatically indicated by the dot-dash line 41, with the valve 39. Thus as the liquid level in accumulator 32 lowers as the glycol is depleted, valve 39 opens to admit a make-up side stream of the lean first treating solution. The amine content of the latter is at least for the most part vaporized in the reboiler 29, and ultimately is recovered in still 14.

Instead of taking the make-up side stream at the location of line 38, the make-up may be taken from line 12 at the discharge side of pump 21, as through line 42 having a branch 43 connecting with line 27 in advance of the exchanger 28, and a second branch 44 connecting with line 38. Valve 45 is controlled through its connections 46 and 41 with the float control 40, to pass the required make-up to the second solution, in the manner previously described with reference to valve 39. The described make-up lines may contain valves 47, 48 and 49 to permit flow of the solution into the second stage cycle through any of the indicated courses.

I claim:

1. The process of treating a gaseous mixture for the removal of moisture and an acidic compound, that includes contacting the gas with a first liquid solution comprising an acid gas absorbent and a moisture absorbent under conditions resulting in partial vaporization of the acid gas absorbent, then contacting the gas with a second solution containing said moisture absorbent separable by fractionation from said acid gas absorbent and in which is absorbed moisture and the vaporized acid gas absorbent from said first solution, passing the spent first solution through a first heating zone to regenerate the first solution by vaporization of the absorbed acidic compound, passing the spent second solution through a second heating zone to regenerate the second solution by vaporizing therefrom moisture, acid gas absorbent and a small amount of the moisture absorbent, passing the resulting vapors into said first heating zone and therein recovering the vaporized acid gas absorbent and moisture absorbent, introducing to said second solution a sufficient quantity of said first solution to compensate for vaporization of the moisture absorbent from said second heating zone, and contacting gas to be treated successively with the regenerated first and second solutions.

2. The process of treating a gaseous mixture for the removal of moisture and an acidic compound, that includes contacting the gas with a first liquid solution comprising an acid gas absorbent and a moisure absorbent under conditions resulting in partial vaporization of the acid gas absorbent, then contacting the gas with a second solution containing said moisture absorbent separable by fractionation from said acid gas absorbent and in which is absorbed moisture and the vaporized acid gas absorbent from said first solution, passing the spent first solution through a first heating zone to regenerate the first solution by vaporization of the absorbed acidic compound, passing the spent second solution through a second heating zone to regenerate the second solution by vaporizing therefrom moisture, acid gas absorbent and a small amount of the moisture absorbent, passing the resulting vapors into said first heating zone and therein recovering the vaporized acid gas absorbent and moisture absorbent, introducing to said second solution a sufficient quantity of the regenerated first solution to compensate for vaporization of the moisture absorbent from said second heating zone, and contacting gas to be treated successively with the regenerated first and second solutions.

3. The process of treating a gaseous mixture or the removal of moisture and an acidic compound, that includes contacting the gas with a first liquid solution comprising an acid gas absorbent and a moisture absorbent under conditions resulting in partial vaporization of the acid gas absorbent, then contacting the gas with a second solution containing said moisture absorbent separable by fractionation from said acid gas absorbent and in which is absorbed moisture and the vaporized acid gas absorbent from said first solution, passing the spent first solution through a first heating zone to regenerate the first solution by vaporization of the absorbed acidic compound, passing the spent second solution through a second heating zone to regenerate the second solution by vaporizing therefrom moisture, acid gas absorbent and a small amount of the moisture absorbent, passing the resulting vapors into said first heating zone and therein recovering the vaporized acid gas absorbent and moisture absorbent, introducing to the second solution flowing from said second heating zone a quantity of the lean first solution flowing from said first heating zone sufficient to compensate for vaporization of the moisture absorbent from said second heating zone, and contacting gas to be treated successively with the regenerated first and second solutions.

4. The process of treating a gaseous mixture for the removal of moisture and an acidic compound, that includes contacting the gas with a first soltuion of a glycol and amine acid gas absorbent under conditions resulting in partial vaporization of the amine, then contacting the gas with a glycol second solution in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture, amine and some glycol therefrom, condensing the vaporized amine and glycol from the resulting vapors and recovering the condensed amine and glycol in said first heating zone, introducing to said second solution a sufficient quantity of said first solution to compensate for vaporization of glycol from said second heating zone, and contacting gas to be treated successively with the regenerated amine and glycol absorbent.

5. The process of treating a gaseous mixture for the removal of moisture and an acidic compound, that includes contacting the gas with a first solution of a glycol and amine acid gas absorbent under conditions resulting in partial vaporization of the amine, then contacting the gas with a glycol second solution in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture, amine and some glycol therefrom, condensing the vaporized amine and glycol from the resulting vapors and recovering the condensed amine and glycol in said first heating zone, introducing to the spent second solution a sufficient quantity of the regenerated first solution to compensate for vaporization of glycol from said second heating zone, and contacting gas to be treated successively with the regenerated amine and glycol absorbents.

6. The process of treating a gaseous mixture for the removal of moisture and an acidic compound, that includes contacting the gas with a first solution of a glycol and amine acid gas absorbent under conditions resulting in partial vaporization of the amine, then contacting the gas with a glycol second solution in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture, amine and some glycol therefrom, condensing the vaporized amine and glycol from the resulting vapors and recovering the condensed amine and glycol in said first heating zone, introducing to a stream of the spent second solution flowing to the second heating zone a quantity of the regenerated first solution flowing from said first heating zone sufficient to compensate for vaporization of glycol from said second heating zone, and contacting gas to be treated successively with the regenerated amine and glycol absorbents.

WILLIAM F. CHAPIN.

REFERENCES CITED

The following references are of record in the file of this patent:

UNITED STATES PATENTS

| Number | Name | Date |
|---|---|---|
| 2,177,068 | Hutchinson | Oct. 24, 1939 |
| 2,435,089 | McCartney | Jan. 27, 1948 |